Figure 1:
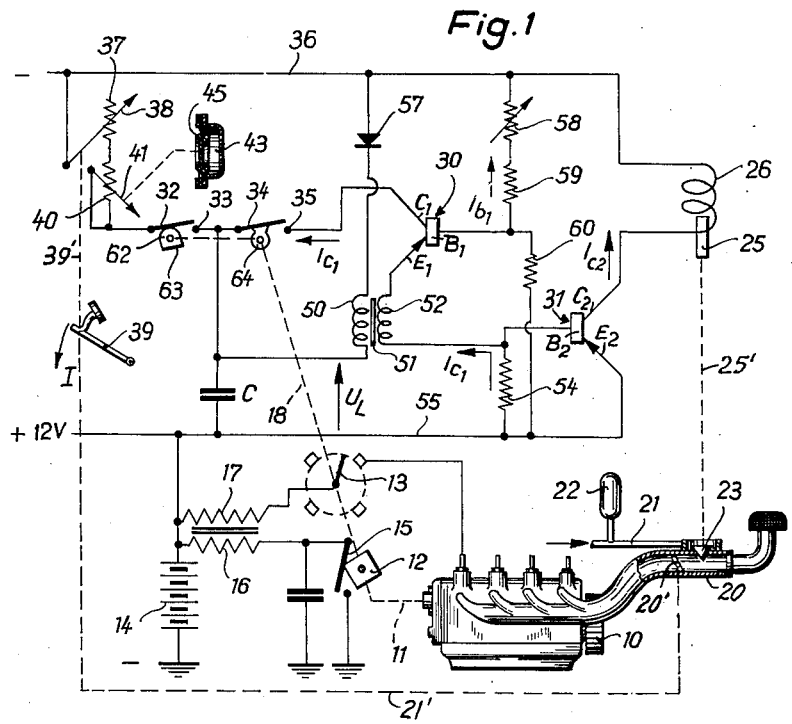

May 2, 1961

R. ZECHNALL ET AL 2,982,276

PULSE GENERATING SYSTEM FOR ELECTRONIC FUEL
INJECTION CONTROL DEVICES AND THE LIKE

Filed July 24, 1958

INVENTORS
RICHARD ZECHNALL
KURT PAULE
BY
ATTORNEY

United States Patent Office 2,982,276
Patented May 2, 1961

2,982,276

PULSE GENERATING SYSTEM FOR ELECTRONIC FUEL INJECTION CONTROL DEVICES AND THE LIKE

Richard Zechnall and Kurt Paule, Stuttgart, Germany, assignors to Robert Bosch G.m.b.H., Stuttgart, Germany Filed July 24, 1958, Ser. No. 750,825

Claims priority, application Germany Aug. 28, 1957

13 Claims. (Cl. 123—119)

The present invention relates to electronic pulse generating systems of the type utilizing the charge and discharge of an electrical capacitor as a means for producing pulses of varying length or duration, more particularly though not limitatively, for use in connection with electronic fuel injection control systems for internal combustion devices embodying an injection carburetor and means to control the fuel injection time by said pulses energizing an electrically controlled injection valve.

It has already become known to meter or control the amount of the fuel injected into the air intake chamber of an internal combustion engine equipped with an injection carburetor, in particular for use on automobile vehicles, by means of an electromagnetically controlled injection valve, energized by electric current pulses having a recurrence frequency synchronized with the engine and produced by the periodic and alternate charge and discharge of an electrical capacitor. In arrangements of this type it is customary, in order to initiate an injection cycle, to open the valve and to hold it in open position until the pulse amplitude has decreased to a predetermined value, in such a manner as will result in varying amounts of fuel being injected under constant pressure in proportion to the effective pulse length or duration.

In fuel injection control systems of this type, in order to cause the amount of the injected fuel to remain substantially constant for pulses of equal effective length and/or to enable a close and proportional control of the injected fuel in dependence upon the pulse length or duration, it is advisable, if not necessary, that the trailing edges of the pulses approach a rectangular shape as close as possible. Great difficulties are, however, encountered in practice in producing steep-edged pulses economically and efficiently by relatively simple means, especially where the pulse length or duration is controlled by the discharge time of an electrical capacitor. On the other hand, the utilization of a capacitor discharge has the advantage of affording a simple and efficient control of the pulse duration by means of any number of variable sensing or control resistors connected in either the charging or discharging circuit of the capacitor and being controlled in dependence upon varying operating parameters or conditions, such as engine speed, air intake throttle position, atmospheric pressure, coolant temperature, etc., in an effort to effect an automatic control of the amount of fuel being injected such as to maintain a substantially constant and favorable fuel-air ratio, or to produce any other desired effect or result.

While it is possible to improve the pulse shape by means of special shaping devices or circuits, the latter involve generally the use of auxiliary amplifiers and complex circuitry, as well as auxiliary devices, whereby to result in an undesirable increase in the complexity of the injection control circuits, not to mention the high cost rendering the use of such devices prohibitive from an economic point of view.

Accordingly, an important object of the present invention is the provision of a simple and efficient electronic pulse generating system, especially suitable for energizing the electrically controlled fuel injection valve of the injection carburetor of internal combustion devices or engines, whereby the above and related difficulties are substantially overcome or minimized.

A more specific object of the invention is the provision of a pulse generating system of the above type utilizing the charge and discharge of an electrical capacitor, to determine pulse width or duration, whereby pulses having a relatively steep trailing edge are obtained with a minimum of parts or apparatus, as well as at relatively low cost.

Another object of the invention is generally to provide a simple and efficient electronic fuel injection control system for internal combustion engines equipped with an injection carburetor, whereby the amount of the injected fuel may be controlled or metered to relatively close tolerances in dependence upon varying operating parameters or conditions of the engine, in particular the air intake throttle position, atmospheric pressure and coolant temperature, in such a manner as to automatically maintain a most favorable (stoichiometric) fuel-air ratio and, in turn, to insure optimum operating efficiency and economy.

Yet another object of the invention is the provision of an electronic pulse generating system utilizing the charge and discharge of an electrical capacitor in conjunction with simple and efficient means to cause a substantially linear discharge of said capacitor followed by a rapid decay of the discharge current, to result in a steep-edged current pulse.

A further object of the invention is the provision of an electronic pulse generating system utilizing a substantially linear discharge of an electrical capacitor, to produce a pulse of varying length or duration by controlling the rate of decrease of the discharge voltage.

Figures 2, 3:
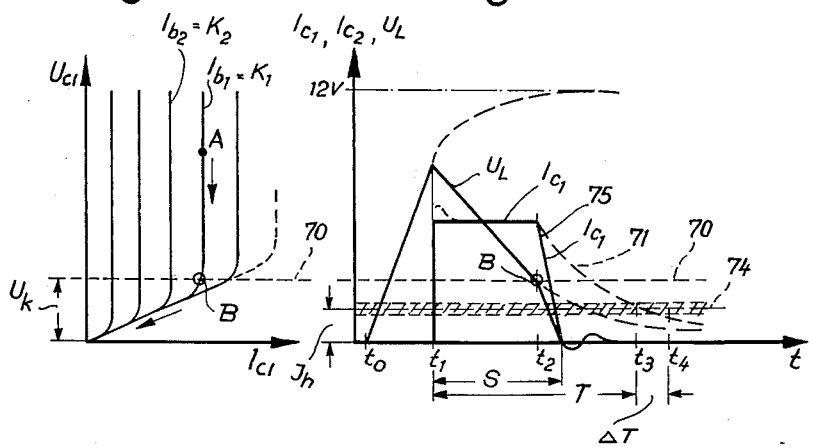

The above and further objects, as well as novel aspects, of the invention will be better understood from the following detailed description of a practical embodiment thereof taken in conjunction with the accompanying drawing forming part of this specification and wherein:

Fig. 1 is a schematic representation and circuit diagram of an electronic fuel injection control system for internal combustion engines embodying the principles of the invention; and Figs. 2 and 3 are theoretical diagrams or graphs explanatory of the function and operation of the invention as exemplified and shown in Fig. 1.

With the foregoing objects in view, the invention, in its preferred embodiment, involves generally the provision of a capacitor charging and discharge system operated in synchronism with an internal combustion engine equipped with an injection carburetor having an electromagnetically controlled fuel injection valve, to periodically and alternately charge and discharge said capacitor. The capacitor discharge circuit includes a constant current device in the form of a saturable impedance, preferably the emitter-collector path of a transistor, biased to a point substantially beyond the saturation point, whereby to result in a substantially linear discharge or constant discharge current of said capacitor. As a consequence, the rate of discharge and, in turn, the length of the discharge current pulses may be varied simply by varying the potential of the control or base electrode of the transistor or equivalent device, whereby to provide a simple and efficient means for and method of controlling the fuel injection time, and, in turn, the amount of the injected fuel in dependence upon varying operating conditions or controls. Additional control may be effected by varying the charging rate of the capacitor by one or more variable control or sensing resistors inserted in the capacitor charging circuit. Due to the substantial linear discharge or constant discharge current, relatively steep-edged pulses are produced suitable for simplified and efficient control of the injection time within relatively close limits or tolerances.

In carrying the invention into effect, there are especially suitable transistors or equivalent saturable impedance devices having an output current-output voltage saturation characteristic with the current at first rising relatively rapidly from zero to a bent or saturation point above which the output current remains substantially constant or independent of output voltage, the magnitude of the current at saturation depending upon the potential of the control electrode or base of the transistor. According to an improved feature of the invention, to insure steep-edged current pulses, such as where the output or collector current rises at a relatively slow rate from zero to the saturation point, the sudden current change at the instant of the capacitor discharge voltage passing through said saturation point is utilized to produce and apply a transient voltage to said capacitor, in such a manner as to accelerate the final discharge of the capacitor and to result in a trailing edge of the pulses of increased steepness, as will be described in further detail hereafter.

It is to be understood that, while a transistor is described and shown as a preferred constant current or saturable impedance device inserted in the discharge circuit of the capacitor, any equivalent impedance having a saturation characteristic as described above, such as a vacuum tube or triode may be employed, in accordance with the broader spirit and purview of the invention.

Referring more particularly to the drawing, Fig. 1, the numeral 10 indicates an internal combustion engine, shown as a four-cylinder engine in the example illustrated and having a cam shaft 11 driving in a known manner a cam 12 and the distributor arm 13 of a high-voltage ignition system energized by a battery 14. Connected between the ignition switch 15 operated by the cam 11 and the plus pole of the battery 14 is the primary winding 16 of a spark coil or ignition transformer whose secondary or high tension winding 17 is connected to the engine spark plugs through the rotating distributor arm 13 in conventional manner well known to those skilled in the art.

Numeral 20 denotes the air intake of the engine to which is connected the electromagnetically controlled fuel injection valve of an injection carburetor having applied thereto a fuel under constant pressure through a feed line 21. The latter may be fitted with a buffer or pressure equalizing chamber 22 and connected to the fuel tank of the engine through a fuel pump, in a manner well known and understood.

The injection valve shown comprises a movable valve member or valve cone 23 which may be lifted from its cooperating stationary valve member or seat by the iron core or plunger 25 of a magnetic control winding or solenoid 26, the valve member 23 being suitably mechanically connected to or coupled with the plunger 25, as indicated by the dashed line 25' in the drawing. In order to operate the injection valve, to control the amount of fuel injected into the air intake chamber of the engine, there is provided according to the invention an improved electronic fuel injection control system producing an exciting current pulse for the solenoid 25 during each operating cycle of the engine, whereby to raise the valve member 23 from its seat and to maintain the valve in open position during the fuel injection periods against the action of a suitable bias or return spring (not shown) normally urging the valve member to closed position, as shown in the drawing.

The pulse generating and control system, as exemplified by the drawing, comprises essentially a pair of conventional transistor or semiconductive triodes 30 and 31 having emitter elements $E_1$ and $E_2$, base or control electrodes $B_1$ and $B_2$ and collector or output electrodes $C_1$ and $C_2$, respectively, an electrical capacitor C and a pair of charging and discharging switches 32 and 34 synchronized with the engine and actuated by cams 63 and 64, respectively, synchronized or connected with the cam 12 and distributor 13, as indicated by the dashed line 18 in the drawing. The switch 32 controlled by the cam 63 cooperates with a fixed contact 33 and is inserted in the charging circuit of the capacitor C, while the switch arm 34 cooperating with a fixed contact 35 is inserted in the discharge circuit of the capacitor which further includes the emitter-collector path $E_1$—$C_1$ of the transistor 30 and a coupling resistor 54. Cam 64 is designed to open the switch 34 for a brief period only during each revolution of the distributor shaft 18 while the switch 32 is closed to charge the capacitor C by the battery 14.

Inserted in the lead from the switch arm 32 to the negative pole of the battery 14 is a variable resistor 37 having an adjustable contact 38 which is coupled with a foot pedal 39, as indicated by the dashed line 39' in the drawing. The foot pedal 39 is shown to operate the throttle valve 20' in the air intake 20, as indicated by the broken line 21' to control the power output of the engine in a manner well known and understood. Connected in series with the resistor 37 is a further variable resistor 40 having an adjustable contact 41 short-circuiting varying numbers of winding turns of the resistor and being coupled with the diaphragm 45 or the like operating member of a pressure gauge 43 responsive to the prevailing atmospheric pressure in the vicinity of the engine, in such a manner that for high pressure the contact 41 is in a position close to the junction between the resistor 40 and the switch arm 32 while for low atmospheric pressure the contact 41 is displaced by the outward movement of the diaphragm 45 of the gauge 43 to include to full value of the resistor 40 in the charging circuit of the capacitor. In other words, the total resistance included in the capacitor charging circuit will be the less, the more the pedal 39 is depressed in the direction of the arrow I and the more the diaphragm 45 is moved inwardly by increasing atmospheric pressure.

Further connected to the junction point of the switch arm 34 and the fixed contact 33 of the switch 32 is one end of the winding 50 of a transformer having an iron core 51 and a cooperating winding 52, the latter having one of its ends connected to the base $B_2$ of the transistor 31 and having its opposite end connected to the emitter $E_1$ of transistor 30. The base $B_2$ of transistor 31 is further connected through the fixed resistor 54 to the plus pole or line 55 of the battery to which is also directly connected the emitter $E_2$ of the transistor 31. The collector of the latter is connected to the minus pole or line 36 of the battery by way of the solenoid winding 26 of the injection valve. Both transistors are shown to be of the well known PNP type. For NPN type transistors, all the polarities must be reversed, in a manner well known and understood by those skilled in the art. There is further shown a rectifier 57 serving as a unidirectional conductor and being connected between the minus line 36 and the remaining end of the transformer winding 50, the polarity connection of said rectifier being such as to prevent any current flow between the capacitor C and the line 36 through the winding 50, but to enable a current to flow in the reverse direction under certain specific conditions to be described in greater detail hereafter.

Connected to the minus line 36 is a further thermally responsive resistor 58 of the type having a negative temperature coefficient and being in heat exchanging connection with the cooling medium of the engine, such as by directly immersing it in the engine radiator or water cooling system. In other words, resistor 58 has a low resistance for high coolant temperature and vice versa. Connected in series with the resistor 58 and the plus line 55 are a pair of further fixed resistors 59 and 60 forming a voltage divider with the junction point between resistors 59 and 60 being connected to the base $B_1$ of transistor 30, to provide suitable base operating bias potential, as described in greater detail hereafter.

The function and operation of the system aforedescribed is as follows. While the engine and with it the distributor shaft 18 rotate at a certain speed or number of revolutions per minute, the cam 62 cooperating with the switch arm 32 closes the charging circuit of the capacitor C over a rotational angle determined by the flat 63 upon the circumference of the cam 62. During this period, a charging current is applied to the electrode of the capacitor C connected to the fixed contact 33 determined by the voltage of the battery 14, in the one hand, such as a conventional automobile battery, and by the adjusting values of the control or sensing resistors 37 and 40, on the other hand. The charging of the capacitor is completed, as soon as the cylindrical portion of the cam engages the switch arm 32, whereby to disengage the latter from its fixed contact 33. As the distributor shaft 18 continues to rotate, the cam 64 releases the switch 34, whereby the latter is urged into engagement with the fixed contact 35 by the action of a suitable return spring or the like (not shown), thus closing the discharging circuit of the capacitor C including the emitter-collector path of the transistor 30. As a consequence, a positive equalizing current is allowed to flow to the negatively charged electrode of the capacitor by way of the resistor 54, winding 52 and the emitter-collector path of the transistor 30, said discharge current being indicated at $I_{c1}$ in the drawing. The intensity of the current $I_{c1}$ is practically independent of the instantaneous voltage of the capacitor C by suitably biasing the base $B_1$ of the transistor 30 by the voltage divider comprising resistors 58, 59 and 60, to cause a predetermined base current $I_{b1}=K_1$ and by operating the transistor at a point A of its characteristic substantially above the saturation point B, as shown in Fig. 2 of the drawing representing a family of collector current-collector voltage characteristic curves for varying base currents as parameters for a conventional junction transistor. The base current $I_{b1}$ is maintained constant during at least one complete capacitor discharge period, whereby a control of the bias potential by means of the resistor 58, such as by a change from value $I_{b1}=K_1$ to a value $I_b{}^2=K_2$, may be utilized to vary the pulse width and, in turn, the fuel injection time, as will be further described and understood from the following.

Referring further to Fig. 2 the transistor 30 has a collector current $I_{c1}$ beyond a predetermined collector voltage $U_k$, referred to as the saturation voltage of the transistor and represented by the saturation point B of the characteristic, which current is substantially independent of the effective voltage $U_{c1}$ between the emitter $E_1$ and collector $C_1$ of the transistor.

Fig. 3 shows the variation of the capacitor discharge voltage $U_L$ as well as of the discharge current $I_{c1}$ as a function of time $t$. Charging of the capacitor is initiated at the instant $t_0$ corresponding to the closing of the contact 33 by the switch arm 32, while the discharge is started at the instant $t_1$, the interval $t_1-t_0$ corresponding to the charging time determined by the flat 63 of the cam 62. The duration of the discharge of the capacitor determines the open position of the injection valve, thus in turn controlling the amount of fuel injected into the air intake chamber of the engine. More specifically, as the switch arm engages its fixed contact 35 at the instant $t_1$, a collector current is caused to flow through resistor 54 and the base-emitter path of the transistor 30 as a result of the discharge of the capacitor C, said discharge current being indicated by the solid line $I_{c1}$ parallel to the time axis in the drawing. As a result, the voltage drop across the resistor 54 caused by the current $I_{c1}$ biases the transistor 31 which is preferably a power transistor, to carry a considerable collector current $I_{c2}$ energizing the solenoid 26. This, in turn, causes the armature 25 to be attracted by or drawn into the winding 26, thus lifting the valve member 23 and causing fuel under pressure to be injected into the air intake 20 in the form of a finely divided spray or jet. The fuel injection continues until the capacitor voltage $U_L$ has reached a value insufficient to maintain the transistor 31 in its On or conducting condition.

As a result of the practically constant capacitor discharge current $I_{c1}$ the capacitor voltage decreases linearly, as indicated by the solid line $U_L$ in Fig 3 whereby the operating point A of the transistor 30 whose base current $I_{b1}$ is maintained at a substantially contant value $I_{b1}=K_1$ during at least one complete discharge period of the capacitor by the voltage divider 58, 59, 60 is displaced progressively in the direction of the arrow towards the intersection point B with the dotted line 70 parallel to and spaced from the time axis by an amount $U_k$ corresponding to the saturation voltage of the transistor. As soon as the capacitor voltage reaches the saturation voltage $U_k$ at the instant $t_2$, the discharge current $I_{c1}$ will be no longer constant and ordinarily would decay exponentially according to the dashed curve 71 indicated in the drawing. Such a slow decay of the current $I_{c1}$ resulting in a proportional decrease of the collector current $I_{c2}$ of the output transistor 31 energizing the solenoid 26, may result in an inaccurate or erratic pulse length or closing of the valve member 23 by the armature 25. In practice, the lowest value $I_h$ of the magnetizing current sufficient to maintain the valve member 23 in open position fluctuates, due to mechanical vibration, differences of friction coefficient etc., within a range as indicated, by way of example, by the cross-hatched area 74 in the drawing. This makes it possible, for instance, for one fuel injection to be terminated at $t_3$ and for the next injection to be terminated at the instant $t$, provided all other conditions, such as throttle position, coolant temperature etc. have remained constant. Such a difference $\Delta t$ between the injection times may be prohibitive for practical reasons by making it impossible to maintain a constant and favorable fuel-air ratio under varying operating conditions as well as for different power outputs of the engine.

According to the invention, this difficulty is substantially overcome or minimized by the function of the transformer 50, 51, 52 or equivalent reactive coupling means connected between the discharge and charging circuits of the capacitor C. As long as the discharge current $I_{c1}$ of the capacitor flowing through the winding 52 remains at its constant (saturation) value, it strongly magnetizes the iron core 51, in such a manner that during transition of the capacitor voltage through the saturation point B and sudden change of the discharge current, a counter E.M.F. or transient voltage pulse is induced in the winding 50 of the transformer depending upon the rate of decrease of the current $I_{c1}$. This induced voltage is utilized according to the invention to accelerate the final discharge of the capacitor, whereby to insure a steep-edged control pulse for the energization of the injection valve. For this purpose, the polarity connection or sense of the winding 50 is such that, with decreasing capacitor discharge current, the induced voltage causes the end of winding 50 adjacent to the terminal 33 to become positive and causes the end of the winding 50 adjacent to the rectifier 57 to become negative. This, in turn, results in an acceleration of the final discharge of the capacitor after passing of the capacitor voltage through the saturation point B of transistor 30. The result is a rapid return of the discharge current $I_{c1}$ to zero, as indicated by the solid line 75 in Fig. 3. The tolerance range 74 of the solenoid holding current $I_h$ has, therefore, practically no longer any effect or influence on the effective pulse width or duration S. More specifically, the rate of decay of the discharge current depends upon the ratio between the magnetic energy stored in the winding 50 and the residual energy stored in the capacitor C at the instant of reaching the saturation voltage of the transistor 30, optimum steepness of the current decay line 75 being obtained if both energies are equal, as expressed by the following equation:

$$L.I_{cl}^2 = CU_k^2$$

wherein L represents the inductance of the winding 50.

There is thus provided by the invention a pulse generating system which is both simple in design as well as efficient in operation and by means of which steep-edged current pulses of readily controllable length or duration may be obtained by relatively simple means economically and securely. This renders the invention especially suitable for the control of the fuel injection time of an injection carburetor of an internal combustion engine both for controlling the power output of the engine and to maintain a favorable and economical fuel-air ratio under varying operating conditions, in the manner exemplified by the drawing and foregoing description.

In the foregoing the invention has been described with reference to a specific illustrative device or system. It will be evident, however, that variations and modifications as well as the substitution of equivalent elements for those shown herein for illustration, may be made without departing from the broader spirit and scope of the invention as set forth in the appended claims. The specification and drawing are accordingly to be regarded in an illustrative rather than in a restrictive sense.

I claim:

1. A pulse generating system comprising an electrical capacitor, charging and discharge circuits therefor and means to charge said capacitor through said charging circuit and to subsequently discharge it through said discharge circuit, a saturable impedance device included in said discharge circuit having a control electrode and a current voltage operating characteristic comprising an initial region of substantially linearly increasing current proportional to voltage following by a saturation region of substantially constant current independent of voltage beyond a predetermined saturation point and for a given constant potential of said control electrode, a source of direct current to charge said capacitor to a voltage substantially beyond the saturation voltage of said device, means to maintain a substantially constant control potential during at least one complete discharge period of said capacitor, and a transformer having a primary winding connected in said discharge circuit and having a secondary winding connected to said capacitor, to apply a voltage pulse to said capacitor in opposition to and during the transition of the capacitor discharge voltage through said saturation point, to accelerate the discharge of said capacitor and to thereby produce a discharge current pulse having a relatively steep trailing edge and length varying in proportion to said control potential.

2. A pulse generating system comprising an electrical capacitor, charging and discharge circuits therefor and means to charge said capacitor through said charging circuit had to subsequently discharge it through said discharge circuit, a transistor having an emitter, a base and a collector, the emitter-collector path of said transistor being included in series with said discharge circuit, a source of direct current to charge said capacitor to a voltage substantially beyond the collector saturation voltage of said transistor, means to maintain a substantially constant base potential during at least one complete discharge period of said capacitor, and a transformer having a primary winding connected in said discharge circuit and having a secondary winding connected to said capacitor, to apply a voltage pulse to said capacitor in opposition to and during the transition of the capacitor discharge voltage through said saturation voltage, to accelerate the discharge of said capacitor and to thereby produce a discharge current pulse having a relatively steep trailing edge and length varying in proportion to said base potential.

3. In an electronic fuel injection control system for an internal combustion device of the type comprising an electromagnetically controlled injection valve to inject a fuel under pressure into the air intake of said device, means to produce electric current pulses to control said valve, to vary the amount of fuel being injected, said means comprising an electrical capacitor, charging and discharge circuits therefor and switch means to periodically charge said capacitor through said charging circuit and to discharge it through said discharge circuit, a saturable impedance device included in series with said discharge circuit having a control electrode and a current-voltage operating characteristic comprising an initial region of rapidly increasing current proportional to voltage followed by a saturation region of substantially constant current independent of voltage beyond a predetermined saturation point and for a given constant potential of said control electrode, a source to charge said capacitor to a voltage substantially beyond the saturation voltage of said device, and means to maintain a substantially constant control potential during at least one complete discharge period of said capacitor, whereby to produce discharge current pulses having a relatively steep trailing edge and length varying in proportion to said control potential, and means to control said valve by said current pulses.

4. In an electronic fuel injection control system for an internal combustion engine of the type comprising an electromagnetically controlled injection valve to inject a fuel under pressure into the air intake of said engine, means to produce electric current pulses to control said valve, to vary the amount of fuel being injected, said means comprising an electrical capacitor, charging and discharge circuits therefor and switch means to periodically charge said capacitor through said charging circuit and to discharge it through said discharge circuit in synchronism with the rotation of the engine being controlled, a transistor having an emitter, a base and a collector, the emitter-collector path of said transistor being included in series with said discharge circuit, a source to charge said capacitor to a voltage substantially beyond the saturation voltage of the collector current-collector voltage characteristic of said transistor, means to maintain a substantially constant base potential of said transistor during at least one complete discharge period of said capacitor, to produce discharge current pulses having a relatively steep trailing edge and length varying in proportion to said base potential, and means to control said valve by said current pulses.

5. In a fuel injection control system as claimed in claim 4, including means to vary said base potential, to control the amount of fuel injected by said valve.

6. In a fuel injection control system as claimed in claim 4, including a transformer having a primary connected in series with said discharge circuit and a secondary connected to said capacitor, to apply a potential pulse to said capacitor during the transition of the capacitor discharge voltage through said saturation voltage, to accelerate the final discharge of said capacitor.

7. In a system as claimed in claim 6, the provision of a unidirectional conducting device in series with said secondary winding, to prevent charging therethrough of said capacitor by said source.

8. In an electronic fuel injection control system for an internal combustion engine of the type comprising an electromagnetically controlled injection valve to inject a fuel under pressure into the air intake of said engine, means to produce electric current pulses to control said valve comprising a capacitor, charging and discharge circuits therefor and switch means synchronized with said engine to periodically charge said capacitor through said charging circuit and to discharge it through said discharge circuit, a saturable impedance device included in series with said discharge circuit having a control electrode and a current-voltage operating characteristic comprising an initial region of substantially linearly increasing current proportional to voltage followed by a saturation region of substantially constant current independent of voltage beyond a given saturation voltage and for a given constant potential of said control electrode, a source to charge said capacitor to a voltage substantially beyond said saturation voltage, means to maintain a substantially constant potential of said control electrode during at least one complete discharge period of said capacitor, to produce discharge current pulses having a relatively steep trailing edge and length varying in proportion to said control potential, and means to control said valve by said current pulses.

9. In a fuel injection control system as claimed in claim 8, said impedance device being constituted by a transistor having its emitter-collector path included in series with said discharge circuit, and means to control the base potential of said transistor in accordance with a varying operating condition of said engine, to control the injection time and to thereby maintain a predetermined fuel-air ratio.

10. In a fuel injection control system as claimed in claim 8, including a transformer having its primary included in said discharge circuit and having its secondary connected to said capacitor, to apply a voltage pulse to said capacitor during the transition of the capacitor discharge voltage through said saturation voltage thereby, to accelerate the final discharge of said capacitor.

11. In a fuel injection system as claimed in claim 8, wherein said impedance device is comprised of a transistor having its emitter-collector path included in said discharge circuit and wherein said last means is comprised of a power transistor operatively connected between said discharging circuit and said valve.

12. In a fuel injection control system as claimed in claim 11, including a pair of variable resistors connected in series with said charging circuit with means to control the same in dependence upon the air intake throttle position of said engine and the atmospheric pressure, respectively, and further thermally responsive resistance means in the base-emitter circuit of said first transistor, to control the fuel injection time, to thereby maintain a predetermined fuel-air ratio.

13. In a system as claimed in claim 1, the provision of a undirectional conducting device in series with said secondary winding, to prevent charging therethrough of said capacitor by said source.

References Cited in the file of this patent

UNITED STATES PATENTS

| | | |
|---|---|---|
| 2,694,161 | Holst | Nov. 9, 1954 |
| 2,764,688 | Grayson et al. | Sept. 25, 1956 |
| 2,815,009 | Pribble | Dec. 3, 1957 |
| 2,827,568 | Altschul | Mar. 18, 1958 |
| 2,845,910 | Pribble | Aug. 5, 1958 |
| 2,864,354 | Bartz | Dec. 16, 1958 |

FOREIGN PATENTS

| | | |
|---|---|---|
| 193,939 | Austria | Dec. 10, 1957 |
| 1,163,659 | France | Apr. 28, 1958 |